(12) United States Patent
LeMerise et al.

(10) Patent No.: US 8,230,739 B2
(45) Date of Patent: Jul. 31, 2012

(54) ROTATIONAL SPEED SENSOR ASSEMBLY

(75) Inventors: John Edward LeMerise, Macomb, MI (US); Chad Michael Korte, Dearborn, MI (US); Patrick Meloche, Northville, MI (US); John Patrick Joyce, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 526 days.

(21) Appl. No.: 12/436,964

(22) Filed: May 7, 2009

(65) Prior Publication Data

US 2010/0281975 A1    Nov. 11, 2010

(51) Int. Cl.
*G01P 1/02*    (2006.01)
(52) U.S. Cl. .................................................. 73/491
(58) Field of Classification Search .................. None
See application file for complete search history.

(56) References Cited

U.S. PATENT DOCUMENTS

| | | | |
|---|---|---|---|
| 3,949,841 A | 4/1976 | Jovick et al. | 188/181 R |
| 4,090,592 A | 5/1978 | Jovick et al. | 188/181 R |
| 4,683,775 A | 8/1987 | Hilker et al. | 74/710 |
| 4,893,075 A | 1/1990 | Dierker, Jr. | 324/174 |
| 4,953,670 A | 9/1990 | Chemelewski | 188/181 A |
| 5,067,350 A | 11/1991 | Grillo et al. | 73/494 |
| 5,486,757 A | 1/1996 | Easley | 324/174 |
| 5,551,291 A * | 9/1996 | Morita | 73/494 |
| 6,073,713 A | 6/2000 | Brandenburg et al. | 180/65.2 |
| 6,209,389 B1 * | 4/2001 | Sakamoto et al. | 73/115.08 |
| 6,238,316 B1 | 5/2001 | Sturm | 475/150 |
| 6,453,742 B1 * | 9/2002 | White et al. | 73/494 |
| 6,490,914 B1 | 12/2002 | Brandenburg et al. | 73/117.3 |
| 6,549,001 B1 | 4/2003 | Dobbs et al. | 324/173 |
| 6,664,780 B2 | 12/2003 | Dobbs et al. | 324/173 |
| 6,817,961 B2 | 11/2004 | Moore et al. | 475/85 |
| 7,878,059 B2 * | 2/2011 | Campbell | 73/488 |

* cited by examiner

*Primary Examiner* — Harshad R Patel
(74) *Attorney, Agent, or Firm* — L. C. Begin & Associates, PLLC

(57) ABSTRACT

A sensed element is disclosed for incorporation into an apparatus that includes a rotatable shaft. The sensed element includes at least one sensor-detectible feature detectible by a sensing device for use in measuring a rotational speed of the shaft, a base portion coupled to the shaft so as to rotate with the shaft, and a projection extending from the base portion. The projection is engageable with a portion of the apparatus to limit movement of the sensed element along the shaft. The projection may also aid in positioning the sensed element within the apparatus during installation and removal of the sensed element.

16 Claims, 3 Drawing Sheets

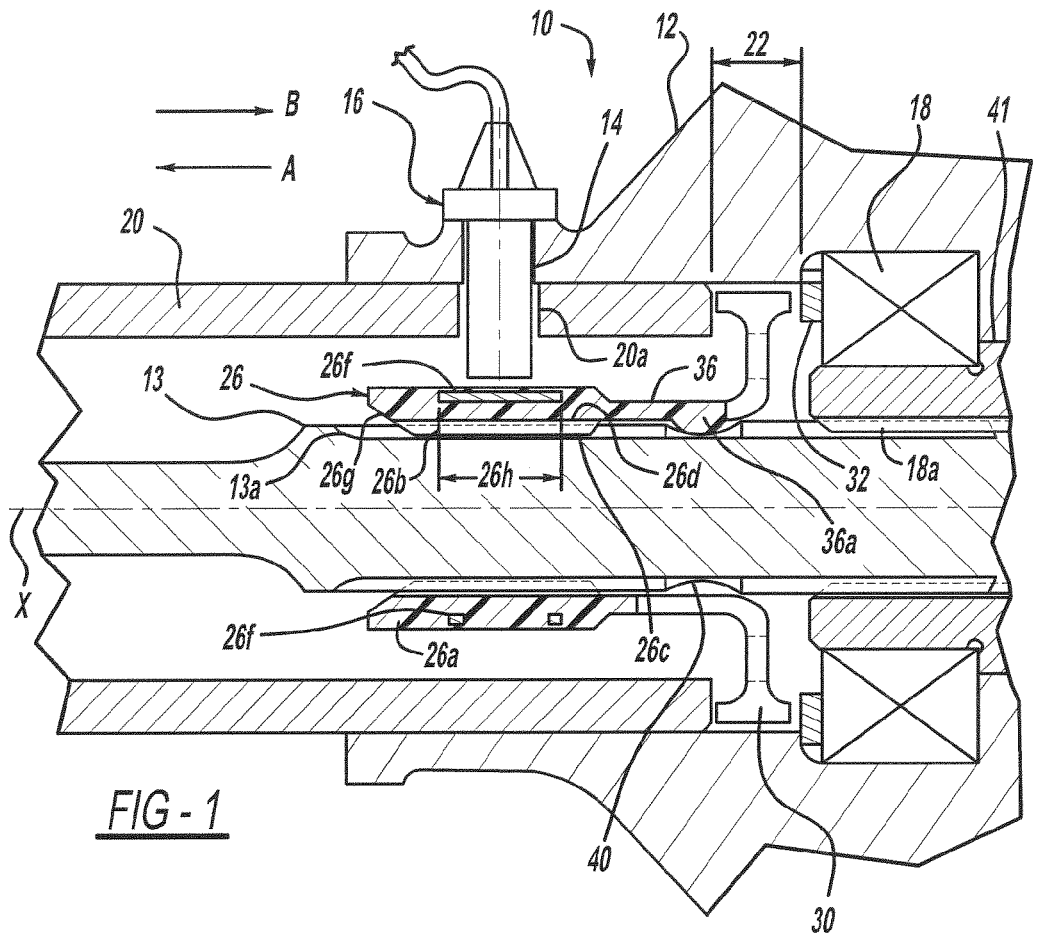
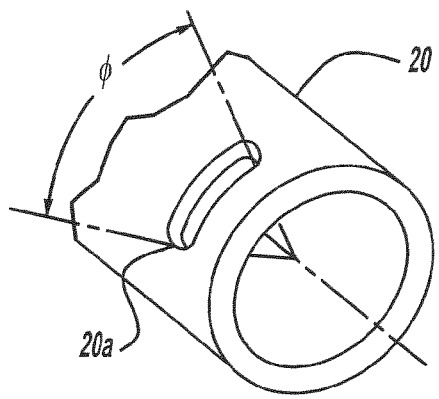
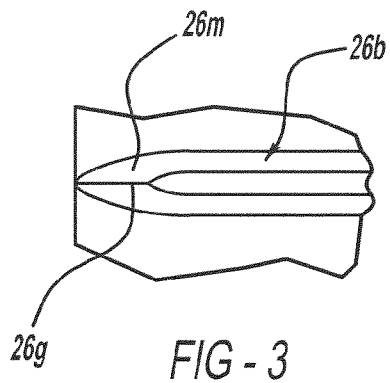
FIG - 1
FIG - 2
FIG - 3

ROTATIONAL SPEED SENSOR ASSEMBLY

BACKGROUND OF THE INVENTION

The present invention relates generally to sensor assemblies for measuring the rotational speed of an object and, more particularly, to an apparatus for securing a sensed element of a sensor assembly in a desired position along a rotating object to facilitate accurate measurement of the rotational speed of the object.

Rotational speed sensor assemblies for measuring the rotational speed of an object are known in the art. In one application of such systems, a rotational speed of a shaft or wheel mounted in a vehicle is measured. In one approach for locating such sensor systems on the vehicle, the sensor system is positioned near the wheel whose speed is to be measured. This solution has many disadvantages, including thermal concerns (temperatures to which the sensor components are exposed may exceed the rated temperatures of the devices), constraints on the packaging and mounting of the sensor assembly elements, problems with routing of signal transmission cables, additional assembly operations, and other concerns.

SUMMARY OF THE INVENTION

The present invention provides a sensed element for incorporation into an apparatus that includes a rotatable shaft. The sensed element includes at least one sensor-detectible feature detectible by a sensing device for use in measuring a rotational speed of the shaft, a base portion coupled to the shaft so as to rotate with the shaft, and a projection extending from the base portion. The projection is engageable with a portion of the apparatus to limit movement of the sensed element along the shaft. The projection may also aid in positioning the sensed element within the apparatus during installation and removal of the sensed element.

BRIEF DESCRIPTION OF THE DRAWINGS

FIG. 1 is a partial cross-sectional view of a portion of a differential assembly containing a rotational speed sensor assembly in accordance with an embodiment of the present invention.

FIG. 2 is a partial perspective end view of an axle tube in accordance with an embodiment of the present invention.

FIG. 3 is a view of a lead-in feature formed on splines of a sensed element in accordance with an embodiment of the present invention.

FIG. 4A is a cross-sectional end view of a sensed element mounted on a shaft in accordance with another particular embodiment of the present invention.

FIG. 4B is a cross-sectional view of a portion of the sensed element of FIG. 4A.

FIG. 5A is a partial cross-sectional view of a portion of the sensed element shown in FIG. 5.

DETAILED DESCRIPTION

Figure 4:
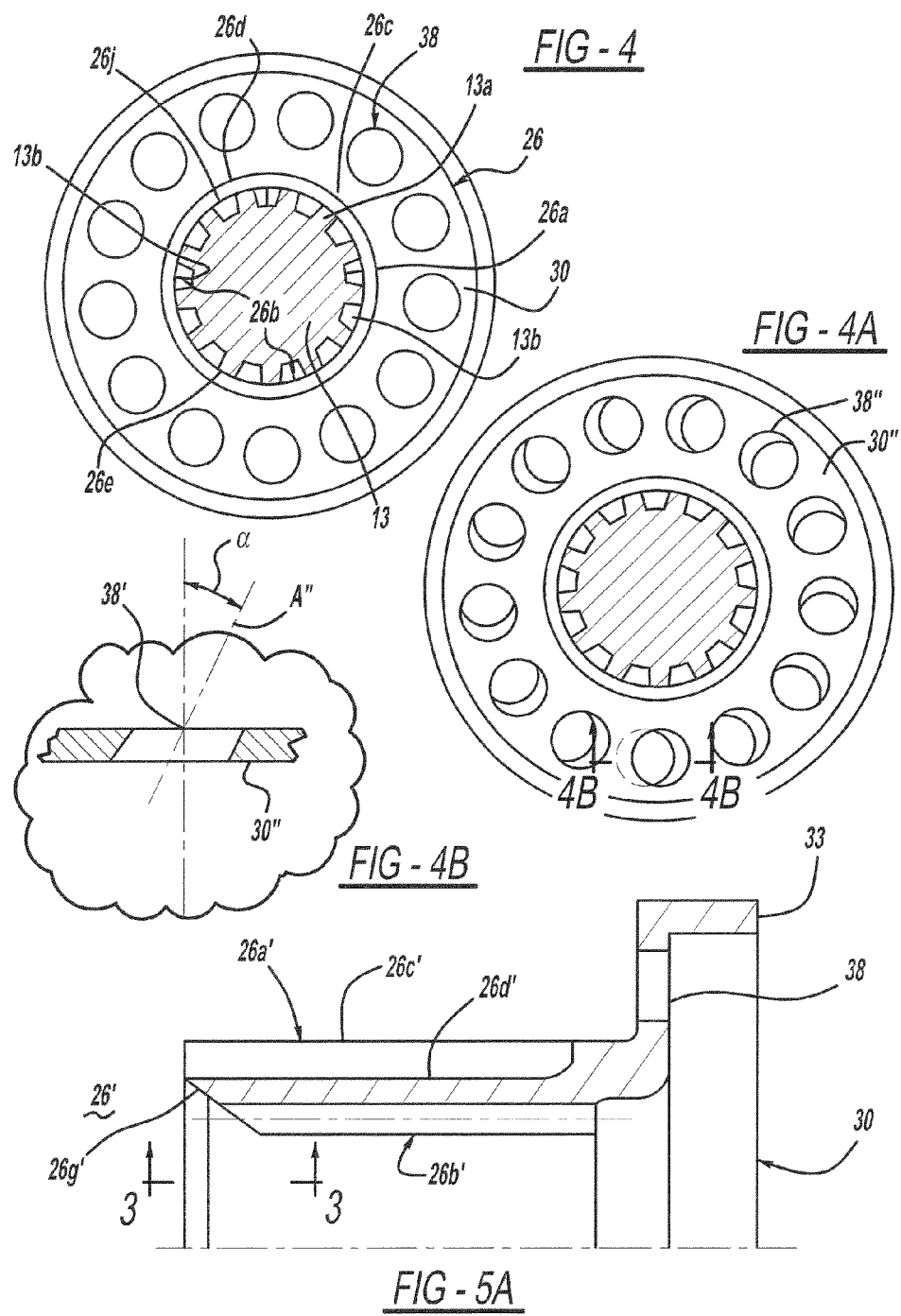
FIG. 4 is a cross-sectional end view of a sensed element mounted on a shaft in accordance with a particular embodiment of the present invention.
Figure 5:
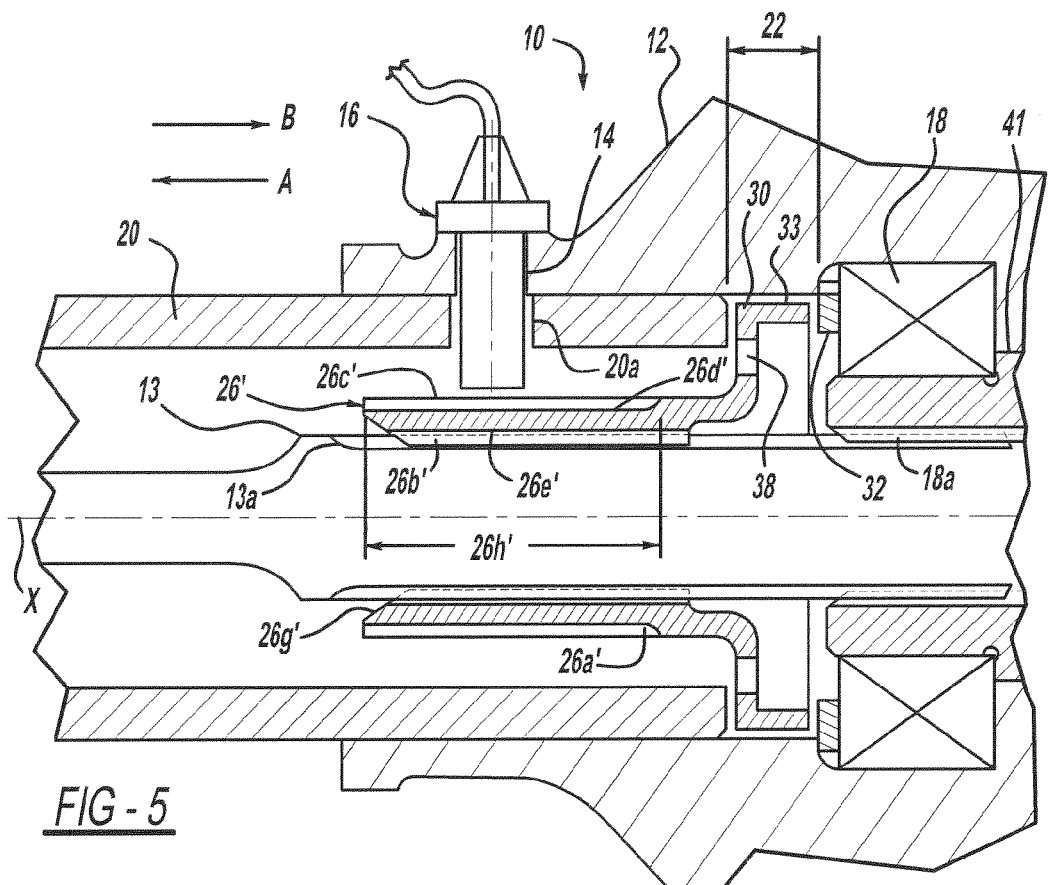
FIG. 5 is a partial cross-sectional view of a portion of a differential assembly containing a rotational speed sensor assembly in accordance with another embodiment of the present invention.

Embodiments of the present invention disclosed herein provide a rotational speed sensor assembly including a sensing device mounted in and/or extending into an interior of a differential housing and an axle tube containing an axle shaft on which a vehicle wheel is mounted. The sensor assembly also includes a sensed element rotationally coupled to the axle shaft and positioned in relation to the sensing device such that sensor-detectible features on the sensed element are registered by the sensing device during rotation of the shaft. While the embodiments of the sensor assembly mounting system disclosed herein are described as they may be applied to sensing the rotational speed of a vehicle wheel mounted on an axle shaft, the mounting system disclosed herein could also be used for other applications requiring measurement of the rotational speed of a body. In addition, it is understood that an embodiment of the rotational speed sensor assembly described herein may be mounted on any other axle of the vehicle, thereby enabling the rotational speed of the other axle(s) to be measured independently.

FIG. 1 shows a rotational speed sensor assembly 10 mounted along an axle shaft 13 and inside a housing 12 of a vehicle differential mechanism (only partially shown). The speed sensor 10 is positioned remotely of a vehicle wheel (not shown) which would be to the left as viewed. Housing 12 includes a passage 14 formed for mounting of a sensing device 16 (described below) therein. The elements of the embodiments of the rotational speed sensor assembly 10 described herein may be accessed and serviced by removing a portion of differential housing 12 and/or shaft 13. A suitable roller bearing 18 is mounted in differential housing 12 for supporting axle shaft 13 and an associated ring gear carrier assembly 41 in a manner known in the art, so as to enable rotation of the shaft and the vehicle wheel attached thereto.

An axle tube 20 is secured to and extends through at least a portion of differential housing 12 for mounting of axle shaft 13 therein. In the embodiment shown in FIG. 1, an opening 20a is formed in a wall of the axle tube 20. Opening 20a is aligned with passage 14 in differential housing 12 and is configured for mounting of sensing device 16 therein. As seen in FIG. 2, axle tube opening 20a may extend a predetermined angular distance Ø along the axle tube wall to provide a degree of flexibility in aligning opening 20a with passage 14 formed in differential housing 12 during assembly of the axle tube into the differential housing. Similarly, passage 14 formed in differential housing 12 may also extend a corresponding angular distance along the differential housing to provide a degree of flexibility in positioning of sensing device 16 along the differential housing.

In the embodiments shown herein, axle tube 20 is secured within differential housing 12 so as to provide a gap 22 between the axle tube and bearing 18. As described in greater detail below, a portion of a sensed element 26 extends into gap 22 for purposes of locating and retaining the sensed element along a longitudinal axis of shaft 13.

Referring to FIGS. 1 and 4, axle shaft 13 has a series of axially-extending splines 13a formed along an exterior surface thereof. Splines 13a engage complementary splines or teeth 18a formed along an inner diameter of ring gear carrier assembly 41, thereby coupling shaft 13 to the bearing. However, other methods of rotationally coupling the shaft to the inner bearing ring may also be used.

In the embodiment shown, splines 13a are also extended along shaft 13 to engage complementary splines or teeth 26b formed along an interior opening 26e of an annular base portion 26a of sensed element 26 (described in greater detail below), thereby rotationally coupling the sensed element 26 to the shaft 13. In other embodiments (not shown), a separate series of splines (or one or more other engagement features) are formed along the portion of the shaft 13 to be rotationally coupled to the sensed element 26. These features on the shaft then engage complementary features formed along base portion 26a of sensed element 26, to rotationally couple the sensed element to the shaft.

Referring again to FIG. 1, rotational speed sensor assembly 10 includes sensed element 26 rotationally coupled to an axle shaft 13 of a vehicle, and a sensing device 16 configured to sense rotation of the sensed element 26 and to generate an electrical signal corresponding to the rotational speed of the sensed device, in a manner known in the art. Embodiments of the sensor assemblies described herein may be employed for measuring vehicle wheel speeds in anti-lock brake systems or traction control systems, for example.

The operation of various types of passive and active sensing devices and associated sensed elements for detection of shaft rotational speeds is well known. In a typical wheel speed sensor assembly as employed in the embodiments of the present invention, rotation of the sensed element 26 in proximity to the sensing device 16 will induce an electromagnetic potential having pulses or a frequency proportional to the relative rotational speed of the sensed element.

Referring again to FIG. 1, the sensing device 16 extends through passage 14 formed in the differential housing 12 where an appropriate retaining means (not shown) and sealing means (not shown) maintains the positioning of the sensing device through operation and ensures that oil within the housing 12 will not be lost. As seen in FIG. 1, the sensing device 16 occupies a position radially spaced apart from the surface of the sensed element 26. During installation of the rotational speed sensor assembly 10 into a vehicle, the general tolerances normally maintained will result in a predetermined distance or air gap between the sensing device 16 and the sensed element 26 which is within desired operating limits to insure accurate speed indication. However, the sensing device 16 may be mounted in the differential housing 12 so as to permit adjustment of the air gap between the sensing device and the sensed element to accommodate different types of sensing devices, different types of sensed elements, different diameters and part tolerances of the portion of the sensed element residing opposite the sensing device, and other factors relevant to a particular application.

Any suitable type of sensing device may be used, depending on the requirements of a particular application. Hall Effect sensors, magnetoresistive sensors, and variable reluctance (VR) sensors are examples of suitable types of sensors for the application described herein. Sensing device 16 may be operatively coupled to any additional hardware of software elements (for example, a signal translation module, CPU, controller, or other element(s)) required for processing of the sensed signals, as is known in the art.

Referring again to FIG. 1, and as previously described, a plurality of axially-extending splines 26b is formed along an interior surface of annular base portion 26a. Splines 26b are configured to engage complementary splines 13a formed along the exterior of shaft 13, thereby rotationally coupling the sensed element 26 to the shaft 13. Splines 26b may be dimensioned so as to slidingly engage shaft splines 13a during insertion of shaft 13 into the central opening 26e in base portion 26a. Interior splines 26b may be formed from any suitable material, such as a metallic or polymer material.

Shaft splines 13a and complementary base portion splines 26b may have any desired spacing or arrangement along the respective surfaces from which they project. In one embodiment, shaft splines 13a and base portions splines 26b are evenly spaced apart. Referring to FIG. 4, in a particular embodiment, four angularly spaced-apart base portion splines 26b are provided for engaging correspondingly spaced-apart grooves 13b formed between adjacent pairs of spaced-apart shaft splines 13a. Alternatively, a lesser number or a greater number of base portion splines 26b may be provided to engage a corresponding number of grooves formed in shaft 13. Also, in the embodiment shown in FIG. 4, a surface 26j defined by an inner diameter of annular base portion 26a (and from which base portion splines 26b extend radially inwardly) circumscribes the outermost surfaces of shaft splines 13a. Because every groove 13b between adjacent shaft splines 13a is not occupied by a corresponding base portion spline 26b, a pathway for oil or lubricant flow is provided along the shaft 13 via each of the unoccupied grooves 13b. These pathways are useful ways to provide lubrication to the outer axle shaft bearings (not shown) with lubricant traveling from the differential.

Referring to FIG. 3, in a particular embodiment, each of splines 26b of sensed element 26 includes a chamfer or lead-in 26g for facilitating insertion of axle shaft 13 into sensed element 26. Each of base portion splines 26b includes a narrowed or tapered lead-in portion 26m to aid in locating and centering the base portion spline 26b between respective adjacent ones of shaft splines 13a during insertion of the shaft 13 into the sensed element base portion opening 26e.

Referring to FIGS. 1, 5, 5A, and 7, sensed element base portion 26a includes sensor-detectible features forming a target wheel or tone ring. These sensor-detectible features enable measurement of the rotational speed of the base portion by one of the sensing devices previously described when the base portion 26a is coupled to shaft 13. The materials used to form the sensor-detectible features of the base portion 26a and the structures of the sensor-detectible features are affected by the type of sensing device to be used. Numerous examples of such sensor-detectible features are known in the art.

In one example (shown in FIGS. 5 and 5A), the base portion 26a' of sensed element 26' includes a series of alternating, axially-extending lands 26c' and grooves 26d' formed along an exterior of the base portion. The lands 26c' and grooves 26d' are formed from steel or another ferromagnetic material. In a particular application, metallic portions of the sensed element 26' are formed from a ferromagnetic powdered metal, which is die-formed and then sintered into the desired finished form.

Alternatively, the entire sensed element 26 or the base portion 26a alone may be formed from a polymeric or elastomeric material, with ferromagnetic, magnetic, or ferrous elements embedded therein or otherwise secured thereto so as to be detectable by the sensing device. Sensor-detectible elements may be affixed to an outer surface of the base portion, using adhesive bonding or other suitable means. Other possible combinations of structures and materials are also suitable for constructing a sensed element suitable for the purposes described herein. For example, elements comprising alternating pairs of north and south magnetic poles may be molded into the polymeric or elastomeric material, or the alternating pairs of poles may be affixed to an exterior of the base portion by use of a suitable adhesive, for example.

Figure 7:
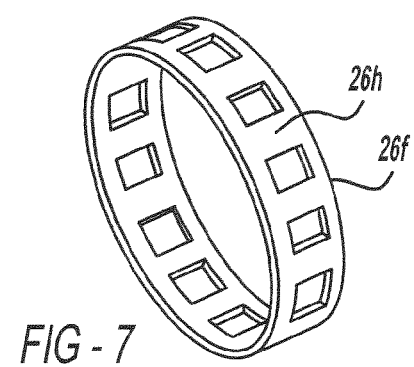
FIG. 7 is an isometric view of a sensor-detectible feature incorporated into a sensed element in accordance with an embodiment of the present invention.

In another example (shown in FIG. 1), the sensor-detectible features are provided by an annular metallic ring 26F embedded in or molded into a polymeric base portion material. An example of a metallic ring suitable for use in such an embodiment is shown in FIG. 7

Referring again to FIG. 1, the extent 26h along base portion 26a of the sensor-detectible features and the positioning of these features along the base portion are specified so as to ensure that the features will be detectible along the entire range of movement of the sensed element along shaft 13 when the shaft and sensed element are rotating. This helps to avoid loss of sensor signals due to misalignment between the sensor and the sensor-detectible features.

The embodiments of the sensed element described herein are also provided with one or more axial positioning features for locating and securing the sensed element along shaft 13. These axial positioning features are engageable with another portion of the vehicle to limit movement of sensed element 26 along the shaft 13 during rotation of the shaft.

Referring to FIG. 1, in one particular embodiment, a flange 30 extends radially away from base portion 26a and into gap 22 between axle tube 20 and bearing 18. In the embodiment shown, the flange extends in a continuous 360° arc around the base portion. In other embodiments (not shown), the flange does not extend in a continuous fashion around the base portion, but rather has a multi-lobed configuration. Depending on the material(s) from which the flange is formed, this configuration may reduce the weight of the flange, the amount of material used to fabricate the flange, and the energy required to rotate the sensed element. Depending on the requirements of a particular application and manufacturing preferences, flange 30 may be formed integral with base portion 26a or the flange may be formed as a separate part and attached to the base portion using any suitable means. Flange 30 may be formed from any suitable material, such as a metallic or polymer material.

In another embodiment (shown in FIG. 5), flange 30 is dimensioned and positioned inside axle tube 20 such that a portion of the flange resides in the gap 22 prior to insertion of shaft 13 into the axle tube. It is seen that, once shaft 13 has been positioned inside the axle tube 20, movement of sensed element 26 along shaft 13 will be constrained by abutting contact between the flange 30 and the edge of the axle tube if the sensed element moves along shaft 13 in the direction indicated by arrow "A". Similarly, movement of sensed element 26 along shaft 13 will be constrained by abutting contact and between the flange 30 and the bearing 18 if the sensed element moves along shaft 13 in the direction indicated by arrow "B". Thus, the flange 30 initially acts to axially position and secure the sensed element along shaft 13 during rotation of the shaft. The flange 30 may also be used to temporarily position the sensed element 26 within axle tube 20 until the axle shaft 13 is inserted into the sensed element 26.

Figure 6:
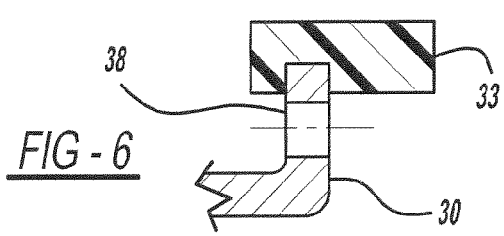
FIG. 6 is a partial view of a portion of a sensed element including a friction-reducing overmold formed threreon, in accordance with another embodiment of the present invention.

If desired, the flange 30 or a portion of the flange may be coated with a low-friction coating (not shown) to aid in minimizing any contact friction between the flange and axle tube 20, and between the flange and bearing 18. Alternatively, as seen in FIG. 6, the portion of the flange residing in gap 22 may be overmolded with a relatively low-friction material 33, such as Delrin® or an acetal polymer, for example. Referring to FIG. 1, in another embodiment, a shim 32 is provided adjacent to a portion of bearing 18 subject to contact with flange 30, to aid in minimizing any contact friction between the flange and the bearing and to aid in removing differential end play between the flange and bearing 18. A similar shin (not shown) may be attached to the portion of axle tube (or to a portion of any other element) subjected to contact with the flange.

Referring to FIG. 4, holes 38 may be formed in flange 30 to enable oil to pass through the flange, to aid in lubrication of the wheel bearing. In a particular embodiment (shown in FIGS. 4A and 4B), each hole of at least a portion of holes 38" extends through the flange 30 parallel to an axis A" formed at an angle α with respect to a line passing through the center of the hole and which extends substantially parallel with an axis X about which flange 30" (and also shaft 13) rotates. When flange 30" is immersed in lubricating oil and rotated, oil is forced through the angular holes 38" to aid in lubricating the outer bearings. Thus, the rotating flange with angular holes 38" acts as a fluid pump.

In another alternative embodiment (not shown), the flange 30 extends into a groove or other feature formed into axle tube 20 or another element of the vehicle. This groove confines the extending portion of flange 30 to correspondingly restrict movement of the sensed element along shaft 13. That is, movement of the sensed element along the shaft after the sensed element has been properly positioned along the shaft will cause the flange to abut a wall of the groove, thereby preventing further motion of the flange within the groove and also preventing further motion of the sensed element along the shaft.

Figure 8:
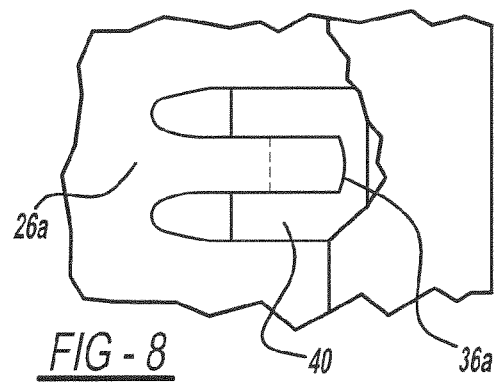
FIG. 8 is a partial plan view of a sensed element showing a detent in accordance with an embodiment of the present invention.

Referring to FIGS. 1 and 8, in another embodiment of a sensed element axial positioning feature, a cantilevered detent 36 extends from base portion 26a to engage the shaft 13 along a depression or cavity 40 formed in the shaft when the shaft is properly positioned relative to the sensed element 26, which has been previously positioned within the axle tube 20. As shown in FIG. 1, depression 40 may extend 360° around the outer surface of the shaft in order to simplify location of the detent within the depression during installation. Detent 36 is configured so as to resiliently deflect due to contact with the shaft 13 while the shaft is being inserted into the base portion central opening 26e. The detent then snaps or slides into cavity 40 when the desired positional relationship between the shaft 13 and the sensed element 26 has been achieved (i.e., when shaft splines 13a are engaged with base portion splines 26b and the sensor-detectible features located along base portion 26a are properly aligned with sensing device 16). Detent 36 may also be dimensioned such that it will be too large to fit within any of the grooves between the shaft splines, thereby preventing the detent from entering the grooves during installation of the sensed element 26 or installation of shaft 13.

In addition, it is seen that after the sensed element 26 has been properly positioned along the shaft, motion of the sensed element along shaft 13 in either of directions "A" or "B" will produce a progressive deflection of the detent as the detent moves closer to an edge of the depression 40. As used herein, the term "progressive" is understood to mean continuously increasing in extent or severity. This progressive deflection results in an increased contact force between the detent and the shaft which acts to resist further motion of the sensed element in the direction of movement, because continued movement of the sensed element along the shaft will cause an increasing deflection of the detent, resulting in a greater reaction force which is manifested as the contact force between the detent and the shaft. By this mechanism, the desired position of the sensed element along the shaft is substantially maintained.

The depression 40 and the detent 36 may be dimensioned such that sufficient contact force is generated by axial displacement of the sensed element from its desired position to maintain the sensed element within a relatively narrow range centered about a desired position of the sensed element along the shaft. Also, detent 36 may be formed integrally with base portion 26a as shown in FIG. 8, or the detent may be formed as a separate part and secured to the base portion 26a using any suitable method. Detent 36 may be formed from any suitable material, for example, a metallic or polymer material. In a particular embodiment (shown in FIG. 1), detent 36 is used in conjunction with flange 30 to position and retain sensed element 26 along shaft 13.

In other alternative embodiments (not shown), a snap ring or other conventional hardware element may be affixed in a suitable groove formed on the shaft or in any other suitable feature for securing the sensed element in position axially along shaft 13.

The entire sensed element 26 (including base portion 26a and any projections extending therefrom as described above) may be formed as a single piece from a polymer material, a metallic material, or any other suitable material.

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A sensed element for incorporation into an apparatus including a rotatable shaft, the element comprising:
   a base portion mountable on the shaft so as to rotate with the shaft;
   at least one sensor-detectible feature coupled to the base portion for use in measuring a rotational speed of the shaft; and
   a projection extending from the base portion and engageable with a portion of the apparatus to limit movement of the element along the shaft, the projection including a flange projecting substantially radially away from the base portion, wherein a plurality of openings are formed in the flange to permit passage of a lubricant therethrough.

2. The sensed element of claim 1 wherein the flange extends in a 360° arc around the base portion.

3. The sensed element of claim 1 wherein the flange has an axis of rotation, and wherein each opening of at least a portion of the openings of the plurality of openings extends through the flange parallel to an axis formed at an angle α with respect to a line which passes through a center of the opening and which is substantially parallel with the flange axis of rotation.

4. An apparatus comprising:
   a rotatable shaft; and
   a sensed element in accordance with claim 1 mounted on the shaft.

5. The apparatus of claim 4 wherein the apparatus comprises a vehicle.

6. The apparatus of claim 4 wherein the projection extends into a gap between adjacent elements of the apparatus, and wherein a motion of the sensed element along the shaft in a first direction brings the projection into contact with one of the adjacent elements of the apparatus, thereby preventing further movement of the sensed element along the shaft in the first direction.

7. The apparatus of claim 6 wherein a quantity of a relatively low-friction material is positioned at a contact interface between the projection and the one of the adjacent elements of the apparatus, for reducing contact friction between the projection and the one of the adjacent elements of the apparatus.

8. The apparatus of claim 7 wherein the adjacent elements of the apparatus include an axle tube enclosing the shaft and a bearing supporting the shaft.

9. The apparatus of claim 4 wherein the shaft has a plurality of splines formed thereon, wherein the base portion has a plurality of splines projecting into a central opening thereof, and wherein the base portion splines complementarily engage at least a portion of the splines of the plurality of the shaft splines to rotationally couple the sensed element to the shaft.

10. The sensed element of claim 9 wherein the number of base portion splines is at least three.

11. A sensor assembly for detecting a speed of a vehicle axle shaft, the sensor assembly including a sensed element in accordance with claim 1 mountable to the axle shaft.

12. A sensed element for incorporation into an apparatus including a rotatable shaft, the element comprising:
   a base portion mountable on the shaft so as to rotate with the shaft;
   at least one sensor-detectible feature coupled to the base portion, for use in measuring a rotational speed of the shaft; and
   a cantilevered projection extending from the base portion and engageable with the shaft to limit movement of the sensed element along the shaft
   wherein the shaft has a depression formed therealong and wherein the projection comprises a detent which engages the shaft along a portion of the depression to limit movement of the sensed element along the shaft.

13. The apparatus of claim 12 wherein movement of the sensed element in a first direction when the detent is engaged with the depression produces a progressive deflection of the detent, and wherein the progressive deflection of the detent produces a force resisting further motion of the sensed element in the first direction.

14. The apparatus of claim 12 wherein the detent extends from the base portion in a direction substantially parallel to an axis of the shaft.

15. An apparatus comprising:
   a rotatable shaft having a depression formed therealong; and
   a sensed element including a base portion mountable on the shaft so as to rotate with the shaft;
   at least one sensor-detectible feature coupled to the base portion for use in measuring a rotational speed of the shaft; and
   a detent extending from the base portion and engageable with the shaft along a portion of the depression to limit movement of the element along the shaft,
   wherein movement of the sensed element in a first direction when the detent is engaged with the depression produces a progressive deflection of the detent, and wherein the progressive deflection of the detent produces a force resisting further motion of the sensed element in the first direction.

16. An apparatus comprising:
   a rotatable shaft; and
   a sensed element including:
      a base portion mountable on the shaft so as to rotate with the shaft;
      at least one sensor-detectible feature coupled to the base portion for use in measuring a rotational speed of the shaft; and
      a projection extending from the base portion and engageable with a portion of the apparatus to limit movement of the element along the shaft,
   wherein the shaft has a plurality of splines formed thereon, wherein the base portion has a plurality of splines projecting into a central opening thereof, and wherein the base portion splines complementarily engage at least a portion of the splines of the plurality of the shaft splines to rotationally couple the sensed element to the shaft.

* * * * *